United States Patent [19]
Ebrahim

[11] Patent Number: 6,154,777
[45] Date of Patent: Nov. 28, 2000

[54] SYSTEM FOR CONTEXT-DEPENDENT NAME RESOLUTION

[75] Inventor: Zahir Ebrahim, Mountain View, Calif.

[73] Assignee: Sun Microsystems, Inc., Palo Alto, Calif.

[21] Appl. No.: 08/674,561

[22] Filed: Jul. 1, 1996

[51] Int. Cl.[7] .................................................. G06F 15/16
[52] U.S. Cl. ............................................................ 709/227
[58] Field of Search ....................... 340/825.52, 825.44, 340/254; 379/100.15, 265, 112, 210, 100–15; 370/254, 401; 709/226–228, 200

[56] References Cited

U.S. PATENT DOCUMENTS

| | | | |
|---|---|---|---|
| 5,025,491 | 6/1991 | Tsuchiya et al. | 340/825.52 |
| 5,136,716 | 8/1992 | Harvey et al. | 395/200.58 |
| 5,227,778 | 7/1993 | Vacon et al. | 340/825.52 |
| 5,274,700 | 12/1993 | Gechter et al. | 379/210 |
| 5,335,268 | 8/1994 | Kelly, Jr. et al. | 379/112 |
| 5,377,323 | 12/1994 | Vasudevan | 395/200.56 |
| 5,392,339 | 2/1995 | Sakai et al. | 379/100.15 |
| 5,506,897 | 4/1996 | Moore et al. | 379/220 |
| 5,577,252 | 11/1996 | Nelson et al. | 395/670 |
| 5,581,761 | 12/1996 | Radia et al. | 395/702 |
| 5,590,186 | 12/1996 | Liao et al. | 379/210 |
| 5,594,921 | 1/1997 | Pettus | 395/831 |
| 5,617,540 | 4/1997 | Civanlar et al. | 395/200.57 |
| 5,652,574 | 7/1997 | Wachoo et al. | 340/825.44 |
| 5,703,943 | 12/1997 | Otto | 379/265 |
| 5,777,989 | 7/1998 | McGarvey | 370/254 |
| 5,778,060 | 7/1998 | Otto | 379/265 |
| 5,838,682 | 11/1998 | Dekelbaum et al. | 370/401 |

FOREIGN PATENT DOCUMENTS

| | | | |
|---|---|---|---|
| 0 380 842 A3 | 8/1990 | European Pat. Off. | G06F 12/08 |
| 0 497 054 A2 | 8/1992 | European Pat. Off. | G06F 13/36 |
| 0 497 054 A3 | 8/1992 | European Pat. Off. | G06F 13/36 |

OTHER PUBLICATIONS

"The SPARC Architecture Manual", Version 9, SPARC International, Inc., Menlo Park, California; 1994; "8 Memory Models"; pp. 117–129 & 256–262.

*Primary Examiner*—John A. Follansbee
*Attorney, Agent, or Firm*—Conley, Rose & Tayon PC; B. Noel Kivlin

[57] ABSTRACT

A context-dependent, multiply binding name resolution system. A name resolver is provided, connected to either a requester's system or a receiver's system, or both. Requests to a given service or domain name are resolved to the appropriate IP address. The intended recipient of the request is resolved based upon a combination of one or more predetermined criteria, including: information about the sender (e.g. geographical location, specific requester identity, etc.); information about the intended recipient (e.g. load balance at the receiver, type of service, etc.); information contained within the request itself (e.g. type of service requested); or other information (time of day, date, random selection of recipient, e.g.). The system is implemented in hardware and/or software, and the resolution criteria can be made interdependent or independent.

20 Claims, 6 Drawing Sheets

| Zone 1 SENDER | Zone 2 RESOLVER SYSTEM | Zone 3 RECEIVER |
|---|---|---|
| Service Location Resolver 1 | Service Location Resolver 2 | Service Location Resolver 3 |
| Destination Lookup1 | Destination Lookup2 | |

FIG. 7

SYSTEM FOR CONTEXT-DEPENDENT NAME RESOLUTION

BACKGROUND OF THE INVENTION

In a network (either Intranet or Internet) system, when a host wants to communicate with another host or locate a service or another host on the network, the address is typically resolved in an absolute manner; that is, the naming service of the network resolves a given name to a single IP (Internet Protocol) address. For instance, a domain name service (DNS) call resolves a name to a single IP address or host name on the Internet.

When there are many connections to a given host or service, the resulting congestion degrades the overall performance. The service provider may upgrade the service, e.g. to increase its capacity. In this case, in order to keep the modification of the service transparent to requesting hosts, a demultiplexer may be used, as illustrated by way of example in FIGS. 1–2. For instance, in FIG. 1 a call to Service 3 will be uniquely resolved to that service's IP address and transmitted there accordingly, because there is only a single binding in the DNS name resolver to the host of Service 3. In general, in a conventional system such as that illustrated in FIGS. 1, 2 and 2A, there will be a single binding between a name and an IP address.

Yet another alternative is for a special type of demultiplexer, which may monitor the traffic, and from the different IP addresses can collect statistics such as response time and/or the load on the corresponding IP hosts, and use this information for load balancing by binding a requested name to an IP address for a host which is less heavily loaded.

If Service 3 is upgraded to include Services 3.1 through 3.Y, then the demultiplexer is added (see FIG. 2); the requesting or DNS resolving host resolves the request as usual and sends it out over the (Inter- or Intra-)network, but the demultiplexer is interposed between the network and the service(s), to route the incoming requests to one of the services. Note that in this case, there is still a single binding between the DNS and the demultiplexer.

A problem with this approach is that the demultiplexer acts as a limiting factor on throughput, and additionally represents a single source of failure for all of the services that it serves. A mechanism is needed whereby such a critical point and bottleneck can be avoided, while still providing access to the services for remote users.

An alternative approach to decreasing congestion is through DNS spoofing, where the name resolver is fooled into giving out a different name binding, by keeping the name resolver updated frequently with a new name resolution binding based on some criteria such as load distribution on target servers. An example of DNS spoofing is shown in FIG. 2A, in which a requester 2 issues a request using the name "sun.com", and a DNS lookup 4 looks it up. The host (1, 2 or 3) to which the names is bound will depend upon criteria employed at the destination domain, as determined by DNS spoofing service 6. Such criteria may include load on the hosts, their availability, etc. The DNS spoofing service 6 polls the hosts 1–3 periodically or at demand, and binds one of them at a time to the DNS lookup name resolver for the name "sun.com".

In a spoofing service, the criteria used to achieve the binding are not related to the context of the requester; they rely only upon information at the destination. Thus, much information that could be important in making a binding is not utilized. In none of the known systems is caller context used.

It would accordingly be advantageous to have a system which takes into account the context of the requester in the process of name resolution.

SUMMARY OF THE INVENTION

A context-dependent name resolution system is presented, which implements predetermined criteria for static or dynamic binding of a "name" to any one of several "objects" of the same type. Which "object" is selected for the binding is determined by a "name resolver" using context information that is explicitly specified by the requestor in a name resolution lookup call to the "name resolver". The "name resolver", which is implemented as a server program, stores a lookup table comprising bindings of a "name" to several different instances of an object, along with "policy" information which defines the criteria for selecting an instance of the object. For instance, the name may be an internet URL of the form "www.sun.com", and the resolved to object may be an IP address of the type 192.146.85.82. Thus the "name resolver" will store the tuple: <www.sun.com><IP_address_1><IP_address_2>. . . , and will store policies on which IP address to bind to www.sun.com when a lookup request specifying "www.sun.com" is received by it.

By enabling multiple binding support in the "name resolver", several advantages are realized. First, the system enables new resources to be added transparently to the caller. When a new server is added to distribute the load for one or more hosts corresponding to the name "sun.com", for instance, the IP address for the new server is simply added to the tuple in the name resolver, along with any desired policy criteria, e.g. to use only between 9 a.m. and 5 p.m.

Secondly, the fundamental limit to scaling which is inherent in today's single binding systems is removed, by enabling multiple destination servers providing the same service to be referenced by the same "name" handle by the caller (for example "sun.com"), and the name to be resolved by the name resolver to different physical computers servers, depending upon caller context. Many instances of the name resolver may be running on different physical computers, and many instances of the services may be running, and the requester will access the name resolver closest to him; and the resolved object that is closest to the requester or that can best serve the request (based upon some selected or predetermined criteria) will be bound to the request, all transparently to the requester. Another advantage of the system of the invention is that it allows resources to be easily replicated transparently to the user, eliminating any single point of failure in the network or at the service end point. If one valid destination fails, is not responding or is over-loaded, the name resolver is already capable of binding a "name" to multiple destinations, and the unavailable destination can be disabled in the name resolver's internal tables, using administrative means.

The context that may be used as a basis for the binding is variable; it may include information about the requester (e.g. requester IP address, domain name or inferred geographical region), about the destination (with similar alternatives), about the request itself (e.g. type or quality of service requested), or about independent information (e.g. time of day or time zone of the point of origin of the request).

BRIEF DESCRIPTION OF THE DRAWINGS

FIG. 7 is a diagram depicting zones in which domain name service resolvers and service location resolvers of the invention may be located.

DESCRIPTION OF THE PREFERRED EMBODIMENTS

Figure 1:
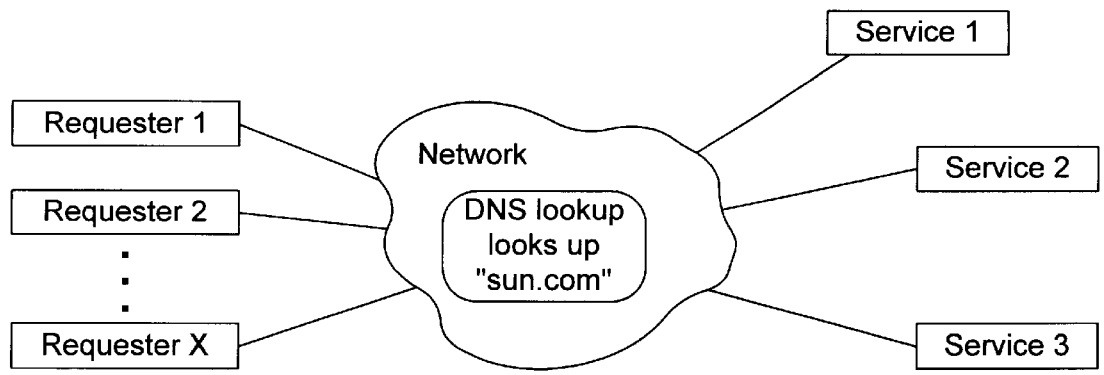
FIGS. 1–2A are diagrams of present network systems used for destination addresses for requests.
Figure 2:
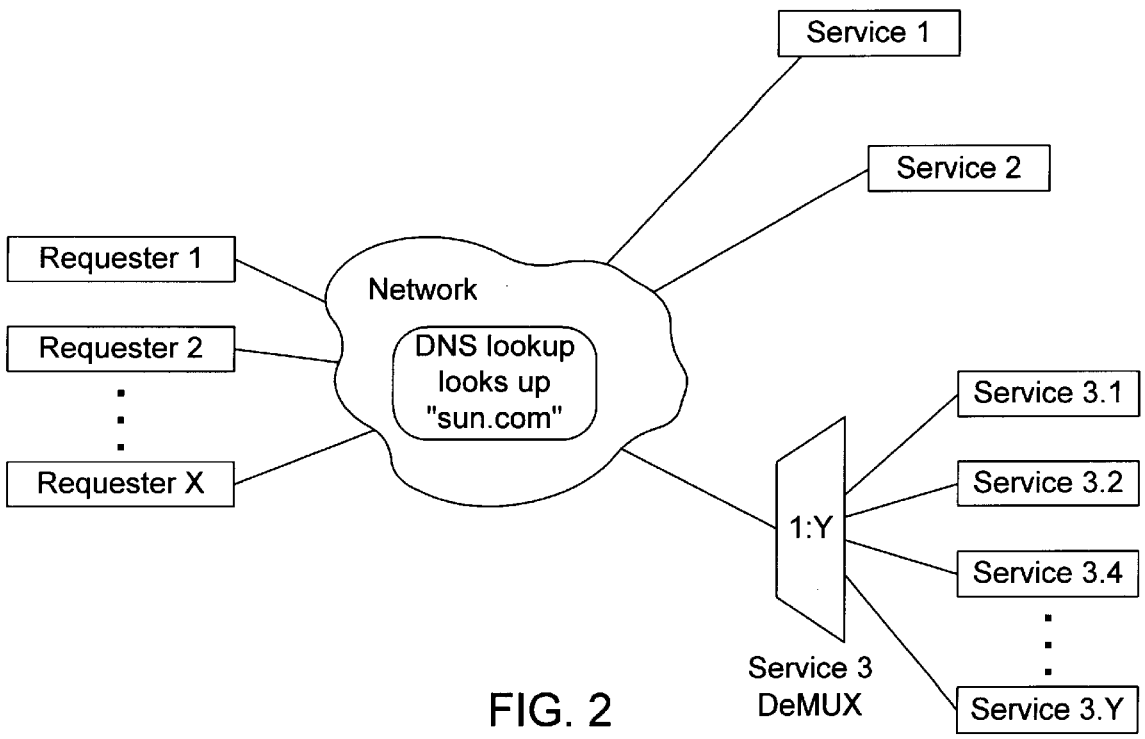
Figure 2A:
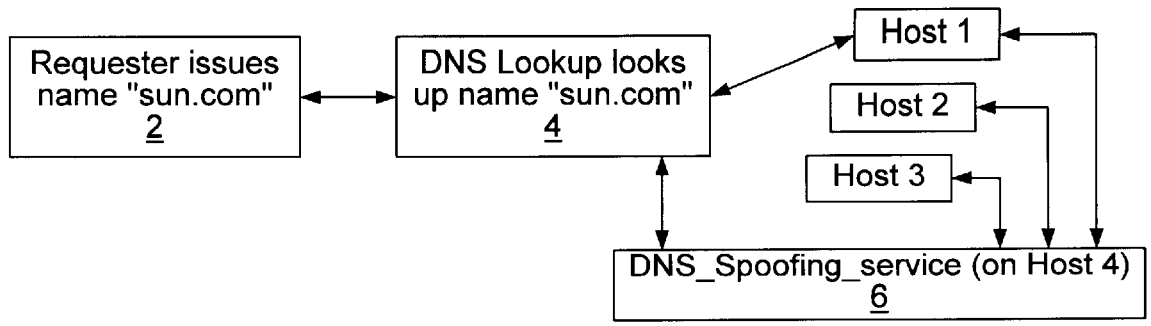
Figure 3:
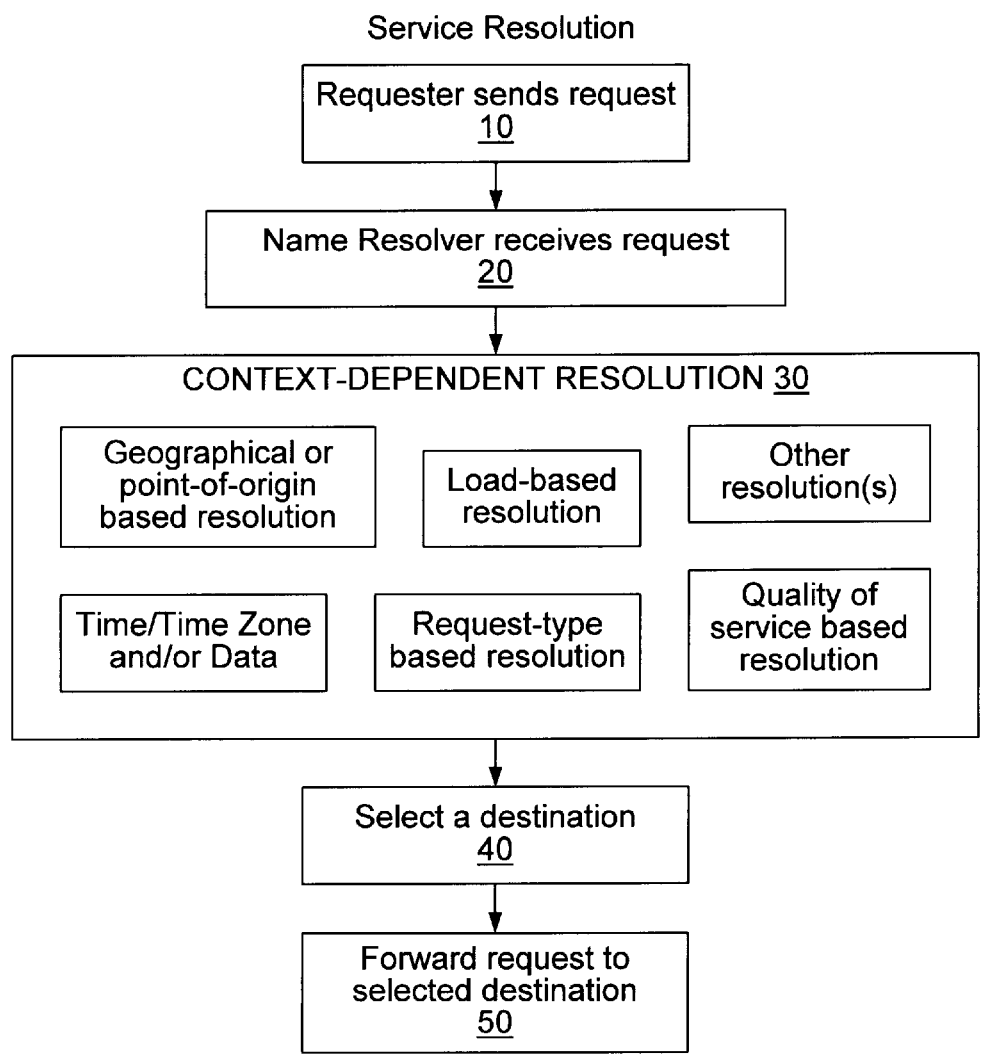
FIG. 3 is a flow chart illustrating a method according to the system of the present invention.
Figure 4:
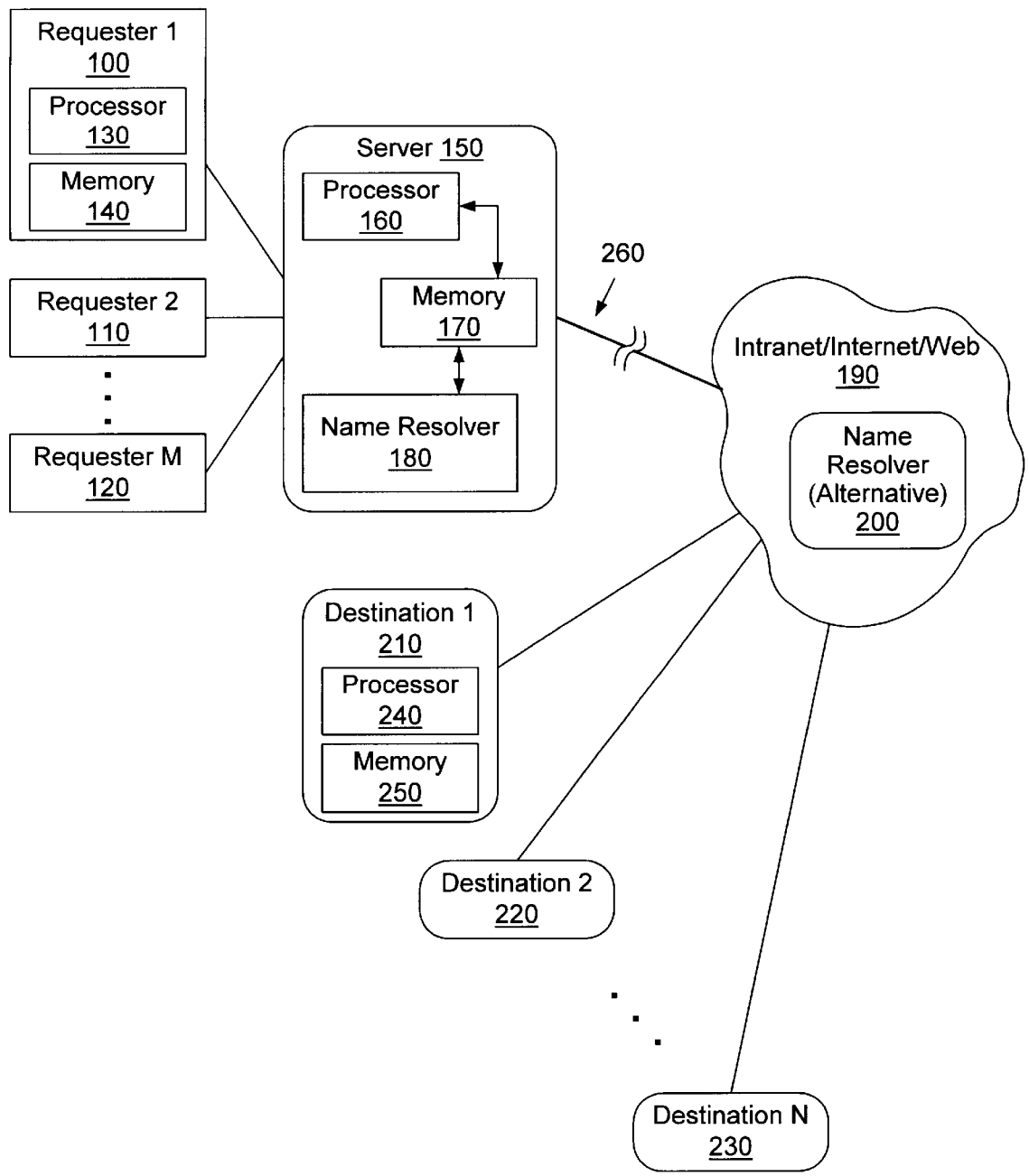
FIGS. 4 and 5 are diagrams of network systems incorporating features of the present invention.
Figure 5:
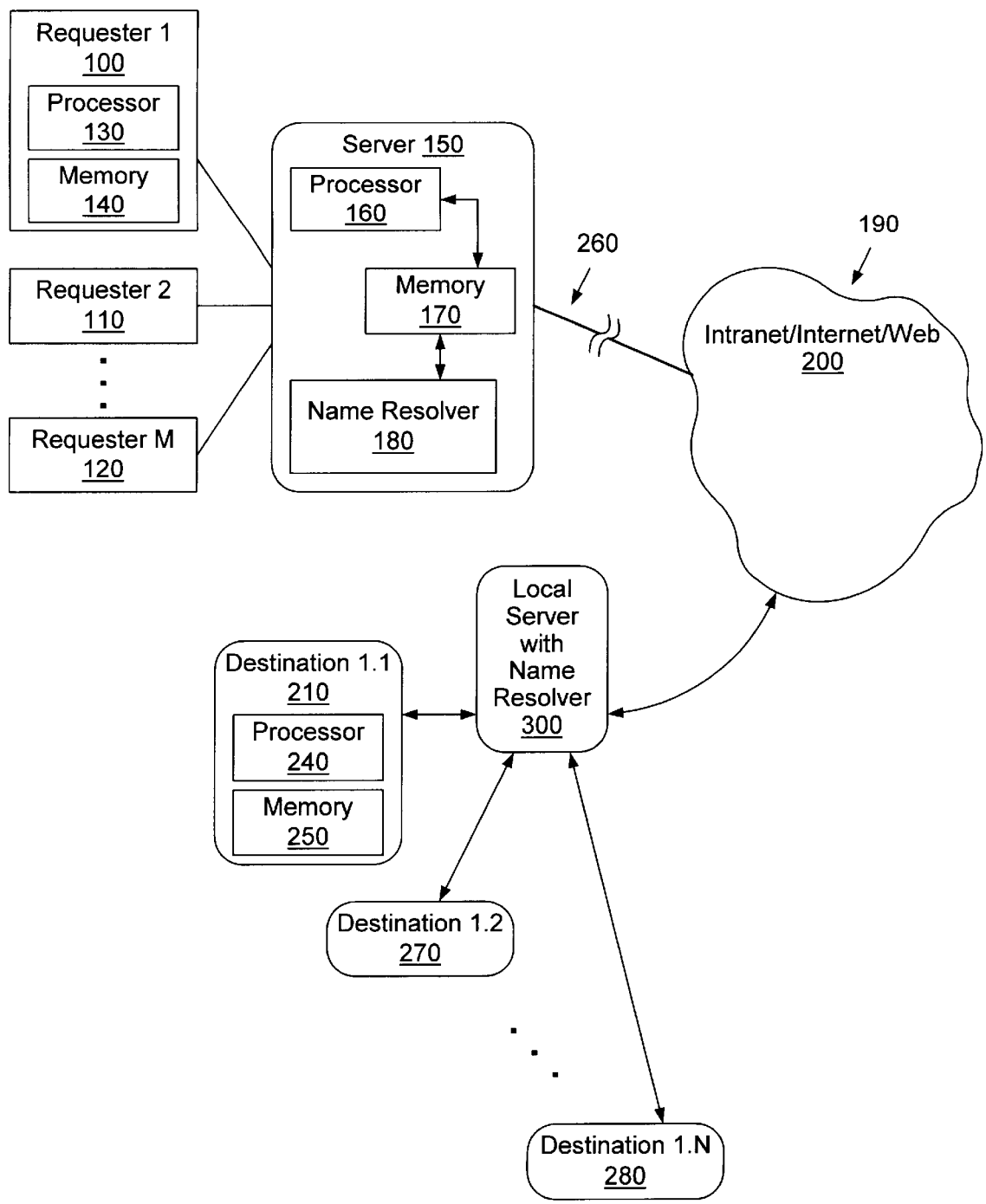

A method according to the invention is illustrated in FIG. 3, and FIGS. 4–5 shows a suitable systems implementable on the Internet or WorldWide Web, the Internet or an Intranet, incorporating features of the name resolution system of the invention.

Name resolution can include any kind of name resolution lookup for binding one object to another. This includes binding the name of a service to a host computer (or its IP address) that provides that service, and binding the type of service to the name of a service providing that type of service. It also includes resolving a name in one domain to another name in the same domain, and to another name in a different domain. For the purposes of this invention, the terms "service" and "host" can be considered synonymous, as can "service location" and "host location".

The system of the invention includes three fundamental features that can be implemented singly or in any combination with one another: multiple binding of destination addresses to names; caller context name resolution in connection with such multiple binding; and name resolution policy considerations, i.e. independent criteria upon which such resolution is based.

Name Resolution: An Example

An example of name resolution occurs, for instance, when a user wishes to view video, e.g. a movie, on his or her computer. An application running on the computer is used to make a procedure call to the name resolver to determine which server can serve a movie, e.g.

service_handle=name_service_lookup("movie")

where the string "movie" is passed to a server, which then returns the name of the service providing that movie (or it may return a linked list of services providing movie services, from which the user may be prompted to select one).

The server may, by way of example, return a single service name (e.g. "quicktime") in the variable called "service_handle". Next, the application must determine which server host can provide this service to this client; to do this, it makes another name resolution call:

host_handle=name_hostname_lookup (service_handle)

and passes it the variable "service_handle" returned by the previous call. This call returns the name of a server which is listed as offering this service.

The network location of this server must now be determined, so that the user's computer or workstation can connect to it to get the movie service, and so it makes the call:

host_IP_address=name_hostaddress_lookup (host_handle)

and finally obtains an IP address of an appropriate host that can provide the movie service to the user.

Further calls to this quicktime server may determine a list of movies that are available. Alternatively, a design may be implemented in which the caller simply specifies the name of the movie he wants to see, and the name lookup returns to the caller the IP address of a host that is currently able to serve the requested movie to the caller.

All of or some of the above steps may be combined in more integrated calls to the name resolver.

In the present invention, in addition to the above, an additional parameter is passed to the name_hostaddress_lookup() function above (or to all the functions above); this parameter may be called the caller_context. This caller_context is used by the name resolver to help it decide which IP address to use. Thus, the calls would look like:

host_IP_address=name_hostaddress_lookup(host_handle, caller_context).

Caller_context is a cookie (or structure) that may include information such as the caller's IP address, its point of origin, the quality of the requested service, or any other context that might be relevant. These contexts must be well specified and their format(s) standardized, so that many different name resolvers can interoperate properly. The particular caller_context formats and contents selected are not themselves crucial to the invention.

The present invention uses requester context-dependent intelligence to determine which of several destination hosts should be utilized, or in other words, which of several IP addresses should be used to resolve a given "name" request. The context-dependent intelligence, implemented as hardware or software or a combination of both, allows the "name" resolution to be based upon some context information from the requestor, and/or upon the "name" being resolved in a context-free manner, but optionally dependent upon criteria such as load balancing on the destination.

As shown in FIG. 4, a requesters 100–120, of which there may be an arbitrary number, each comprise computers or workstations on a local network, served by a server 150. The requesters will typically be conventional workstations, personal computers, or any networkable computing device, with local processors (130, etc.), memory (140, etc.), mass storage (not shown) and network connections. The server 150 also includes a conventional processor 160, memory 170, mass storage and necessary connections and control hardware and software.

A name resolver 180 forms part of the server 150, or may be a separate unit. It may be implemented entirely in software, i.e. as program modules stored in mass storage and/or the memory 170, or it may be a stand-alone device, with its own logic or processor and memory, as desired.

The server 150 is connected to a broader network 190, such as the Internet, an Intranet or WAN (wide-area network), or the WorldWide Web, via a network connection (e.g. a T-line) 260. On this network 190 is optionally another name resolver 200, which may be implemented in the same fashion or differently from the name resolver 180. Name resolvers 180 and 200 may both be used, or either may be used by itself. (See discussion of FIG. 7, below.)

Destination hosts 210–230 may also be conventional computers or workstations with processors (such as 240), memory (such as 250), mass storage (not shown), network connections, etc., as needed to implement conventional network functions in addition to the features of the present invention.

Referring to the flow chart of FIG. 3, when a requester (such as 100–120) sends a name resolution request to a name resolver 180, instead of the single binding of conventional systems, the name resolver 180 includes multiple binding tables and/or functions (implemented by appropriate logic or program modules) to resolve the request to an appropriate IP address for a destination host (such as 210–230 in FIG. 4).

Figure 6:
FIG. 6 in an illustration of the operation of an embodiment of the invention using geography-based resolution criteria.

An example of such a multiple binding would be the binding of multiple, geographically disparate destinations to a single domain name. If, for instance, a user in Germany wishes to access www.sun.com (the WWW server for Sun Microsystems, Inc.), he or she can simply use the Uniform Resource Locator (URL) "http://www.sun.com"). Thus, the user sends the request from requester (see FIG. 6), and the name resolver determines that the requester is in Germany. (See step 20 in FIG. 3). The selected destination may either be in the United States or elsewhere in Europe, since Sun Microsystems in this example has two "sun.com" locations. Since there is a valid European local destination, the name resolver resolves the destination address to sun.com (Europe), as indicated at box 30 of FIG. 3. This resolved destination is then selected for the request packet(s) (box 40 of FIG. 3), and the request is forwarded to sun.com (Europe) (box 50 of FIG. 3).

Following are lists of context-dependent resolution criteria applicable to the invention and usable at box 30 of FIG. 3, where resolution may be based upon requester information, destination information, request contents, or other information:

A. Resolution Based Upon Requester Information

Examples of manners in which the resolution dependent upon requester information may be carried out include:
1. resolution based upon the domain name of the sender;
2. resolution based upon the inferred (looked-up) actual geographic region of the sender;
3. resolution based upon other geography-related information of the sender:
    4. either directly ascertainable from the request (city/country info, e.g.); and/or
    5. indirectly ascertainable (area code, address, etc.);
6. resolution based upon quality of service desired by the requester; and
7. resolution based upon requester's time of day or time zone.

B. Resolution Based Upon Destination Information

Examples of manners in which the resolution dependent upon a specified or intended destination or receiver information may be carried out include:
1. resolution based upon the load at the receiver;
2. resolution based upon the inferred (looked-up) actual geographic region of the receiver;
3. resolution based upon other geography-related information of the receiver:
    4. either directly ascertainable from the request (city/country info, e.g.); and/or
    5. indirectly ascertainable (area code, address, etc.).

Criterion B.1 can be resolved either based upon information as perceived at the sender end or based upon information as it exists at the receiver end, and resolved at the sender end. For example, the sender might frequently send requests to a particular server, service, geographical region or organization. In this case, it may be advantageous to regularly poll one or more oftenused destinations to determine their level(s) of activity. Alternatively, such polling could automatically be carried out for any destinations for which the sender determines that its number of requests exceeds a certain threshold, or for a top predetermined percentage of requests sent by the requester (e.g. all destinations for which the number of requests exceeds N1%, or the top N2 destinations to which the sender makes requests, where N1 and N2 are appropriate predetermined numbers). Polling can be implemented as program modules integral to the name resolver(s), either entirely in one or in more than one location (e.g. partially in a local name resolver and partially in the destination server).

Alternatively or in addition, criterion B.1 may be based upon information at the receive end at the time of sending the request, and resolved at the receiver.

C. Resolution Based Upon Request Contents
1. type of service requested;
2. specific information (or type of information) requested;
3. any other implicit information inferred from the request; and/or
4. any other explicit information obtained from the request.

D. Resolution Dependent Upon Other Factors
1. randomly generated selection of destination based upon qualified list; and/or
2. other independently developed information.

These resolution criteria can be used singly or in any desired combination with one another, as specified by the requester or the administrator of the destination (e.g. server owner or service provider). For instance, in the example of FIG. 6 the resolution of the destination address to sun.com (Europe) could be modified if the load of sun.com (Europe) is larger by some predetermined threshold amount than the load at sun.com (USA)—in which case the sun.com (USA) resolution could override the default sun.com (Europe) resolution for requesters in Europe, either at all times or only during peak European hours, which correspond to off-peak hours in the United States.

An extension of this system is in the resolution of services provided at the receiver network of a request. For instance, a given organization may have many database servers, and request for access to given information may in conventional systems be routed to the same server, because of the single binding nature of destination resolution. With multiple address resolution binding, multiple database servers (or other destination hosts) such as 210, 270, 280, etc. (see FIG. 5) may be made available under a single name, in which case a local service resolution server, such as server 300 in FIG. 5, is provided. The server 300 includes tables, program modules or the like as desired to resolve a request to any one of several to many IP addresses. The selection of a given server to receive a request can depend upon, for example, load at each of the servers.

In general, the resolution systems or subsystems will be in one of three "zones" (see FIG. 7): the sender's zone 1 (up to, e.g., the sender's firewall or Internet server); the name resolver system's zone 2 (which may be at a server on the Internet, or any place outside zone 1 which is not in the receiver's system; and the receiver's zone 3. Service location name resolvers may be in any of zones 1–3; typically, destination lookup name resolvers, which may comprise multiple-binding domain name services (DNS's), will be in either zone 1 or zone 2. It will be understood that zones, for the purpose of this application, are administrative boundaries, and need not correlate to actual network boundaries.

The present invention can interact with existing systems in a number of ways. For instance, in secure systems where the source address is stripped from the request by a firewall (and only, e.g., the domain name remains), then the entire source address would not be used to resolve the destination; the name resolver is provided with the program instructions or circuitry to implement this. Note also that the DNS name resolution may be a distinct operation from service location, and thus the destination can be selected due to a combination of considerations including source address, requested destination address, and request contents, including the type of request made or service requested.

The multiple binding feature of the invention allows a single name, Internet address (e.g. URL address such as http://www.sun.com) or the like to represent as many actual servers (or services) as desired. This has a distinct advantage of allowing modifications, upgrades or replications to be made to the destination server(s) without modification of the destination address or service name as used by the requester. Such modifications may include adding servers or services, or establishing a mirror site at a location geographically near a large source of requests, etc.

There may be security and consistency implications of multiple bindings, with concomitant solutions. If a destination address can be multiply bound, a name resolver may be configured to bind to an incorrect address, either deliberately or otherwise. While this may also be a problem with existing single binding, multiple binding may complicate detection of the problem. Thus, the system of the invention may be combined with programs and tables for verification that a given binding is valid. Very secure systems may wish to limit their multiple binding to a predetermined, fixed number of resolution possibilities, or even maintain the current system of single binding as far as Internet or Web transmission is concerned, and implement multiple binding only behind a firewall. Alternatively or in addition, encryption and digital signatures may be used to ensure validity of bindings, and of modifications or additions to the bindings.

Variations may be had by designating a given name resolution as a default resolution, and utilizing alternative resolutions only upon the request meeting predetermined criteria (such as load imbalance, geographical distance, specific sources of the request, etc.).

Additional bindings (i.e. additional addresses to which a request may resolve) may be added without the requester being aware of it, and indeed substitutions may be made at any time, again transparently to the requester.

F. Service Selection Based Upon Caller Context

The system of the invention may be applied more generally to the use of caller context for name resolution. Context about the requesting user (e.g. in a variable called "caller_context") can be passed to appropriate functions, such as:

service_handle=name_service_lookup("movie", caller_context)

host_handle=name_hostname_lookup(service_handle, caller_context)

Here, the function service_handle executes a service name lookup based upon the input "movie", as well as the information in the variable caller_context, outputting the value service_handle. Given this output as input, along with (again) caller_context, the function host_handle then returns an appropriate host name.

An example of a possible such situation could result when a user desires an encryption service, and several encryption policies are available. The service_handle function can be configured to return different encryption algorithm services based upon the specified destination (which is specified in caller_context), or there may be an effective override in the caller_context by which the user can select a higher level of security.

In general, as noted above, the invention may be implemented at the sender's system or at the destination system, or indeed at points in between (e.g. at proxy servers). Note that single points of failure and bottlenecks are removed using the present system, and a truly distributed, multiply binding name resolution system is achieved.

What is claimed is:

1. A system for name resolution comprising:
   a first service provider;
   a first requester configured to generate a request which indicates a destination name of a service; and
   a name resolver interposed between said first service provider and said first requester, wherein said name resolver is configured to select a destination address corresponding to said destination name of said service from a plurality of destination addresses depending upon at least two of either a geographical location of said first requester, a load of use of said first provider, and/or a time of said request, wherein said geographic location of said first requester is specified as a parameter within said request.

2. The system as recited in claim 1, wherein said name resolver is configured to select said destination address corresponding to said destination name of said service depending upon said date of said request and said time of said request and wherein said date of said request is specified as a parameter within said request and said time of said request is specified as a parameter within said request.

3. The system as recited in claim 1, wherein said name resolver is further configured to select said destination address corresponding to said destination name of said service depending upon at least one of a quality of said service requested by said first requester and a type of said service requested by said first requester.

4. The system as recited in claim 1, wherein said name resolver is further configured to select said destination address corresponding to said destination name of said service depending upon at least two of a type of service provided by said first server provider, a quality of service provided by said first server provider, a date of said service, and a time of said service.

5. The system as recited in claim 1, wherein said first service provider is included within said first host and said first requester is included within said first host.

6. The system as recited in claim 5, wherein said first service provider is included within said first host and said first requester is included within said first host.

7. A system for resolving names comprising:
   a name resolving unit coupled to a requester for a service and a provider of said service, wherein said name resolving unit is configured to select a destination address corresponding to said destination name of said service from a plurality of destination addresses in response to a request for said service, and wherein
   said name resolving unit is configured to select said destination address corresponding to said destination name of said service depending upon at least one of either a geographical location of said requester, a date of said request, and/or a time of said request.

8. The system as recited in claim 7, wherein said name resolving unit is configured to select said destination address corresponding to said destination name of said service depending upon said date of said request and said time of said request and wherein said date of said request is specified as a parameter within said request and said time of said request is specified as a parameter within said request.

9. The system as recited in claim 7, wherein said name resolving unit is further configured to select said destination address corresponding to said destination name of said service depending upon at least one of a quality of said service requested by said requester and a type of said service requested by said requester.

10. The system as recited in claim 7, wherein said name resolving unit is further configured to select said destination address corresponding to said destination name of said service depending upon at least two of a type of service provided by said provider, a quality of service provided by said provider, a date of said service, and a time of said service.

11. The system for resolving names as recited in claim 7, wherein said destination name of said service is a domain name.

12. The system for resolving names as recited in claim 7, wherein said destination address corresponding to said destination name of said service is an IP address.

13. The system for resolving names as recited in claim 7, wherein said name resolving unit is configured to look up said destination name of said service in a lookup table, wherein said plurality of destination addresses are stored in said lookup table in connection with said destination name of said service.

14. A method for resolving names comprising:
   receiving a request for a service from a requester wherein said request indicates a destination name of said service of a provider;
   selecting a destination address corresponding to said destination name of said service from a plurality of destination addresses in response to said request, wherein said selecting said destination address depends upon at least two of either a geographical location of said requester, a load of use of said provider, and/or a time of said request, wherein said geographic location of said requester is specified as a parameter within said request; and
   transmitting said destination address to said requester.

15. The method as recited in claim 14, wherein said selecting said destination address corresponding to said destination name of said service said depends upon said date of said request and said time of said request and wherein said date of said request is specified as a parameter within said request and said time of said request is specified as a parameter within said request.

16. The method as recited in claim 14, wherein said selecting said destination address corresponding to said destination name of said service further depends upon at least one of a quality of said service requested by said requester and a type of said service requested by said requester.

17. The method as recited in claim 14, wherein said selecting said destination address corresponding to said destination name of said service further depends upon at least one of a load of use of said provider, a type of service provided by said provider, a quality of service provided by said provider, a date of said service, and a time of said service.

18. A computer readable storage medium having instructions recorded therein, wherein said instructions are operable to,
   receive a request for a service from a requester wherein said request indicates a destination name of said service of a provider;
   select a destination address corresponding to said destination name of said service from a plurality of destination addresses in response to said request, wherein said select said destination address depends upon at least one of either a geographical location of said requester, a load of use of said provider, and/or a time of said request, wherein said geographic location of said requester is specified as a parameter within said request; and
   transmit said destination address corresponding to said destination name of said service to said requester.

19. The computer readable storage medium as recited in claim 18, wherein said selecting said destination address corresponding to said destination name of said service is dependent upon said date of said request and said time of said request and wherein said date of said request is specified as a parameter within said request and said time of said request is specified as a parameter within said request.

20. The system as recited in claim 18, wherein said selecting said destination address corresponding to said destination name of said service further depends upon at least one of a quality of said service requested by said requester, a type of said service requested by said requester, a load of use of said provider, a type of service provided by said provider, a quality of service provided by said provider, a date of said service, and a time of said service.

* * * * *

UNITED STATES PATENT AND TRADEMARK OFFICE
CERTIFICATE OF CORRECTION

PATENT NO. : 6,154,777  
DATED : November 28, 2000  
INVENTOR(S) : Zahir Ebrahim Page 1 of 1

It is certified that error appears in the above-identified patent and that said Letters Patent is hereby corrected as shown below:

Claims:

Claim 5, Column 8,
Line 36, please change "within said first host" to "within a first host".

Signed and Sealed this

Fourth Day of September, 2001

*Attest:*

Nicholas P. Godici

*Attesting Officer*

NICHOLAS P. GODICI
*Acting Director of the United States Patent and Trademark Office*